United States Patent
Coughlin et al.

(10) Patent No.: US 6,592,005 B1
(45) Date of Patent: Jul. 15, 2003

(54) PILL COUNT SENSOR FOR AUTOMATIC MEDICAMENT DISPENSING MACHINE

(75) Inventors: Shane P. Coughlin, Kansas City, MO (US); Michael E. Coughlin, Mission Hills, KS (US); Stacy Orr, Shawnee, KS (US); Timothy Surgeon, Archie, MO (US)

(73) Assignee: Scriptpro LLC, MIssion, KS (US)

(*) Notice: Subject to any disclaimer, the term of this patent is extended or adjusted under 35 U.S.C. 154(b) by 40 days.

(21) Appl. No.: 10/040,823

(22) Filed: Jan. 7, 2002

Related U.S. Application Data
(60) Provisional application No. 60/288,126, filed on May 2, 2001.

(51) Int. Cl.[7] ............................................. B65G 59/00
(52) U.S. Cl. ........................................ 221/129; 700/241
(58) Field of Search ............................. 221/2, 3, 7, 9, 221/13, 129, 206, 258, 268; 700/231, 241

(56) References Cited

U.S. PATENT DOCUMENTS

| | | |
|---|---|---|
| 1,128,561 A | 2/1915 | Webendorfer |
| 2,690,856 A | 10/1954 | Trondle |
| 3,746,211 A | 7/1973 | Burgess, Jr. |
| 3,921,196 A | 11/1975 | Patterson |
| 4,284,301 A | 8/1981 | Geiger et al. |
| 4,476,381 A | 10/1984 | Rubin |
| 4,660,824 A | 4/1987 | Hermkens et al. |
| 4,753,473 A | 6/1988 | Arnett |
| 4,810,230 A | 3/1989 | Shirasawa |
| 4,835,372 A | 5/1989 | Gombrich et al. |
| 4,857,716 A | 8/1989 | Gombrich et al. |
| 4,872,803 A | 10/1989 | Asakawa |
| 4,902,263 A | 2/1990 | Ito et al. |
| 4,918,604 A | 4/1990 | Baum |
| 4,958,280 A | 9/1990 | Pauly et al. |
| 5,033,785 A | 7/1991 | Woolley, Jr. |
| 5,082,268 A | 1/1992 | Santoro |
| 5,208,762 A | 5/1993 | Charhut et al. |
| 5,332,275 A | 7/1994 | Conway et al. |
| 5,337,919 A | 8/1994 | Spaulding et al. |
| 5,348,061 A | 9/1994 | Riley et al. |
| 5,401,059 A | 3/1995 | Ferrario |
| 5,713,487 A | 2/1998 | Coughlin |
| 5,762,235 A | 6/1998 | Coughlin |
| 5,771,657 A | 6/1998 | Lasher et al. |
| 5,797,515 A | 8/1998 | Liff et al. |
| 5,798,020 A | 8/1998 | Coughlin et al. |
| 5,812,410 A | 9/1998 | Lion et al. |
| 5,860,563 A | 1/1999 | Guerra et al. |
| 5,873,488 A | 2/1999 | Guerra |
| 5,883,370 A | 3/1999 | Walker et al. |
| 5,897,024 A | 4/1999 | Coughlin et al. |
| 5,907,493 A | 5/1999 | Boyer et al. |
| 5,963,453 A | 10/1999 | East |
| 6,036,017 A | 3/2000 | Bayliss, IV |
| 6,036,812 A | 3/2000 | Williams et al. |

FOREIGN PATENT DOCUMENTS

| | | |
|---|---|---|
| JP | 53145260 | 12/1978 |
| JP | 5943743 A | 10/1984 |
| SD | 918086 | 4/1982 |

*Primary Examiner*—Kenneth W. Noland
(74) *Attorney, Agent, or Firm*—Hovey Williams LLP

(57) ABSTRACT

A pill count sensor (10) comprises an electromagnetic energy emitting array (40) and an electromagnetic energy receiving array (42), with a pill detection zone (44) defined therebetween; a sensor amplifier (28); a control board (30) interfaced with a computing device (24); and interconnecting cabling (34, 36, 38). The electromagnetic energy emitting and receiving arrays (40,42) emit and receive, respectively, beams of electromagnetic energy (46) across the zone (44) such that any pill (50) entering the zone (44) is detected by a resulting disruption in received electromagnetic energy at the receiving array (42). The sensor amplifier (28) is operable to automatically self-calibrate in order to compensate for detected electromagnetic energy levels, and to generate a pill sense signal in response to a detected pill (50). The control board (30) is operable to increment a pill count.

20 Claims, 4 Drawing Sheets

PILL COUNT SENSOR FOR AUTOMATIC MEDICAMENT DISPENSING MACHINE

RELATED APPLICATIONS

This application claims priority of a provisional patent application titled "Pill Count Sensor for Automatic Medicament Dispensing Machine", Ser. No. 60/288,126, filed May 2, 2001, hereby incorporated into the present application by reference.

BACKGROUND OF THE INVENTION

1. Field of the Invention

The present invention relates to sensors using electromagnetic energy to detect objects within a detection zone. More particularly, the invention relates to a pill count sensor for use with an automatic medicament dispensing machine, wherein the sensor uses visible red light to detect and count pills and other medicaments such as, tablets and capsules as the pills pass through a pill detection zone. The sensor is further operable to automatically self-calibrate in order to compensate for changing light or other operating conditions.

2. Description of Prior Art

In an effort to improve efficiency, accuracy, and profitability, pharmacies increasingly use automatic medicament dispensing machines to fill prescriptions. Such dispensing machines typically use diffuse reflective infrared photoelectric (DRIP) sensors to count pills, tablets, capsules, or other countable medicaments as each prescription is being filled. Unfortunately, DRIP sensors suffer from several distinct disadvantages, including maintenance problems and inaccuracy. Additionally, DRIP sensors must be cleaned daily to remove foreign matter that might otherwise adversely affect performance.

Maintenance problems arise during initial installation and periodic calibration. DRIP sensors must be modified during initial installation to make them suitable for use with automatic medicament dispensing machines. DRIP sensors are photoelectric-type sensors that function by detecting reflected light, and each broadly comprises an infrared energy emitting lens and an infrared energy receiving lens. In order to increase calibration accuracy, a DRIP sensor must be permanently modified by installing a blocking slit plate on its emitting lens to adjust its sensitivity. However, due to manufacturing variations, the sensor is occasionally rendered insufficiently sensitive by installation of the slit plate. The resulting flawed sensor cannot be returned to the provider for replacement because of the permanent modification, yet cannot be used to count pills, and is thus discarded, thereby increasing overall production cost of the automatic medicament dispensing machine.

DRIP sensors must also be periodically calibrated in order to assure peak performance. Such periodic calibration may be required due to a number of factors, including component aging; temperature variations; power supply voltage fluctuations; and potentiometer drift. Drip sensors are calibrated by mechanical potentiometers. If a DRIP sensor is not calibrated accurately, count inaccuracy or erratic behavior can result; therefore, such calibrations must be performed by a qualified maintenance technician.

Inaccuracy is another disadvantage encountered when using DRIP sensors. As mentioned, DRIP sensors are diffuse reflective-type sensors that operate by detecting reflected energy. The sensors cannot distinguish between energy reflected from pills of interest and energy reflected from other reflective surfaces within the sensor's sensing range. It is therefore often necessary to add matte black material, such as tape or labels, to the dispensing machine to prevent background reflection problems. In addition to adding such material, it is often necessary to calibrate the sensors to operate at a lower sensitivity to prevent sensing and locking onto energy reflected from extraneous background objects or surfaces. When calibrated to operate at a lower sensitivity, the sensors are sometimes unable to accurately count some small pills.

As stated above, DRIP sensors function by emitting infrared energy and measuring any such energy reflected from pills. Unfortunately, some pills are of a color or a texture or have other physical characteristics such that they do not sufficiently reflect infrared or other electromagnetic energy, often resulting in inaccurate counts.

Another disadvantage of DRIP sensors is their tendency to generate false readings in the presence of electric fields, such as the fields encountered during European Electro Magnetic Compliance testing.

Accordingly, there is a need for an improved pill count sensor for use with an automatic medicament dispensing machine that overcomes the limitations of the prior art.

SUMMARY OF THE INVENTION

The present invention overcomes the above-identified problems and disadvantages and provides a distinct advance in the art of pill counting sensors. More particularly, the present invention provides a pill count sensor for use with an automatic medicament dispensing machine, wherein the sensor uses electromagnetic energy, preferably visible red light, to detect and count pills and other medicaments such as, tablets and capsules as the pills pass through a pill detection zone. The sensor is further operable to automatically self-calibrate in order to compensate for changing light or other operating conditions so as to ensure continued accuracy. The preferred sensor is carried on a vial gripping mechanism and broadly comprises a light emitting array and a light receiving array, with a pill detection zone defined therebetween; a sensor amplifier; a control board interfaced with a computing device; and interconnecting cabling. The light emitting and receiving arrays emit and receive, respectively, visible red light across the pill detection zone such that any pill entering the pill detection zone is detected by a resulting disruption in received light at the receiving array. The sensor amplifier is operable to automatically self-calibrate in order to compensate for detected light levels, and to generate a pill sense signal in response to a detected pill. The control board is operable to increment a pill counter, and is interfaced with a computing device operable to report the pill count as determined by the pill counter. The pill counter may be located internally or externally to the control board. The interconnecting cabling operatively interconnects all components using fiber optic and electrical cabling.

In use, when the automatic medicament dispensing machine receives a prescription corresponding to a quantity of pills, the receiving array is moved into position by operation of the vial gripping mechanism. The sensor amplifier automatically calibrates itself to the light level the receiving array receives, with no pill in the pill detection zone. As a pill passes through the pill detection zone, the emitted light is briefly blocked, causing the receiving array to generate a lower light level signal to the sensor amplifier. The sensor amplifier detects the lower light level signal and generates a pill sense signal to the control board. The control board increments the pill counter and so informs the computing device. This process is continued until the proper amount of pills have been dispensed and counted.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
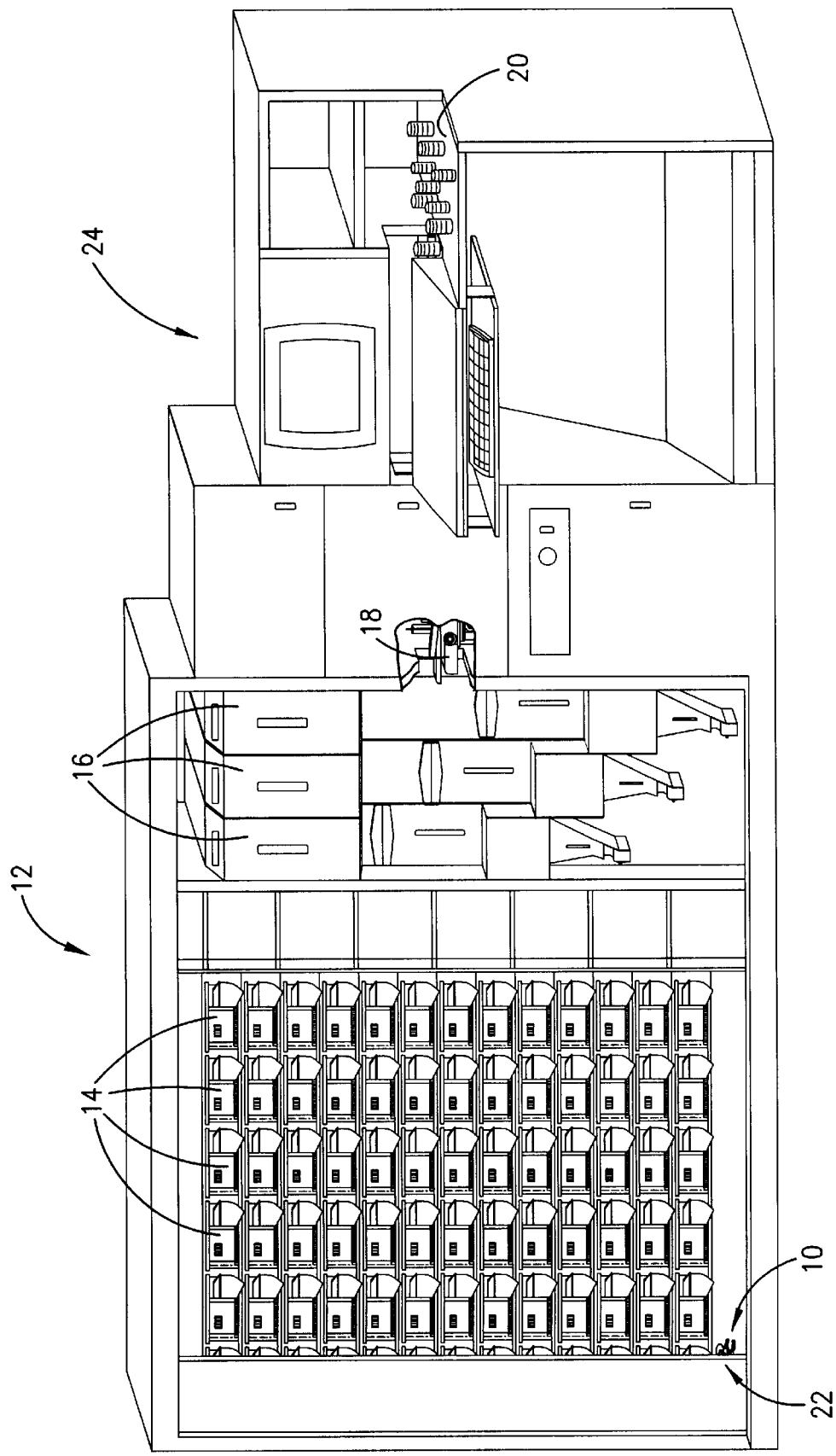
FIG. 1 is a perspective view of an automatic medicament dispensing machine in which a pill count sensor of the present invention may be used.

FIG. 1 illustrates a preferred pill count sensor 10 in accordance with the present invention shown in the preferred environment of use as part of an automatic medicament dispensing machine 12 such as that illustrated in U.S. Pat. No. 5,337,919, incorporated herein by reference. The automatic medicament dispensing machine is operable to substantially automatically fill prescriptions. As shown, the machine 12 includes a plurality of medicament dispensers 14 for storing and dispensing pills and other medicaments, a plurality of vial dispensers 16 for dispensing empty vials, a discharge conveyor 18 for conveying filled vials through a labeler to a discharge station 20, and a vial gripping mechanism 22, all controlled by a computing device 24 under the direction of computer programming.

Figure 2:
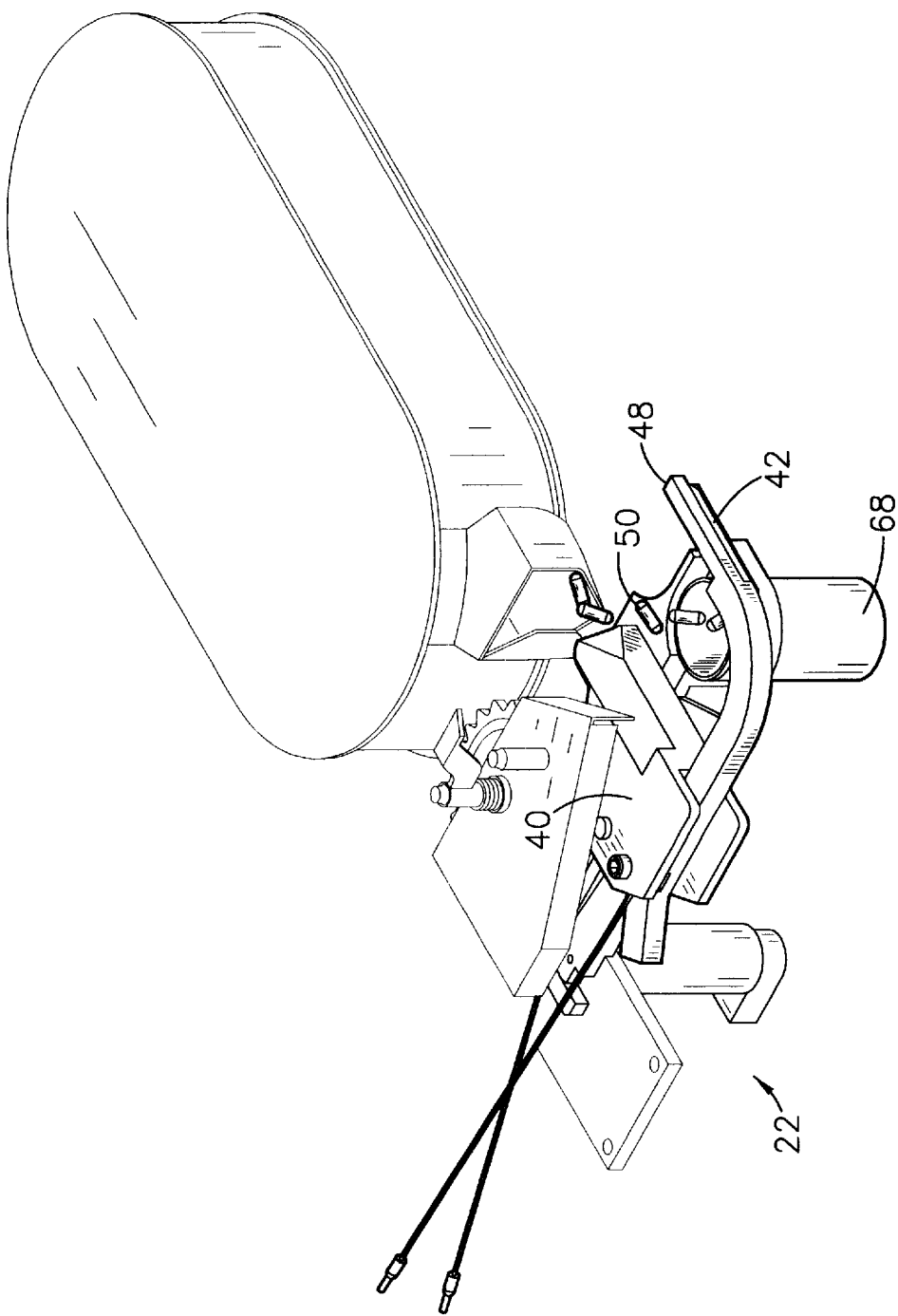
FIG. 2 is a perspective view of a vial gripping mechanism which may carry the pill count sensor.

Referring also to FIG. 2, the pill count sensor 10 is shown constructed in accordance with a preferred embodiment of the present invention. The sensor 10 is preferably carried on the vial gripping mechanism 22 and is operable to self calibrate. The vial gripping mechanism 22 may be similar to the mechanism described and illustrated in U.S. Pat. No. 5,873,488, incorporated herein by reference. The vial gripping mechanism moves within the automatic medicament dispensing machine 12 to retrieve empty vials from the vial dispensers 16 and transport the empty vials to the medicament dispensers 14 in order to fill a prescription. The vial gripping mechanism 22 also transports filled vials to the discharge conveyor 18 so that they can be labeled and presented at the discharge station 20.

Figure 3:
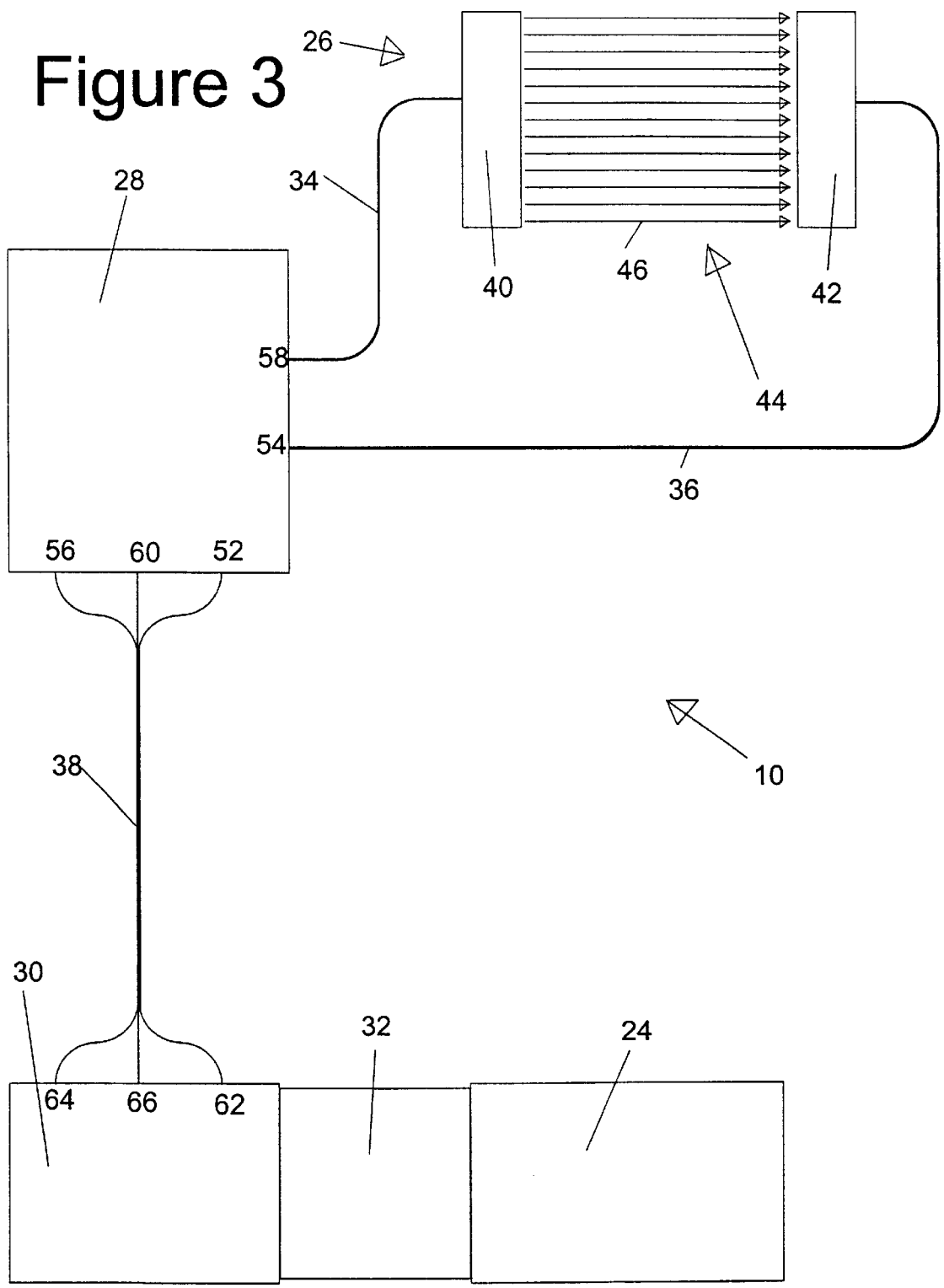
FIG. 3 is a block diagram of a preferred embodiment of the pill count sensor of the present invention.
Figure 4:
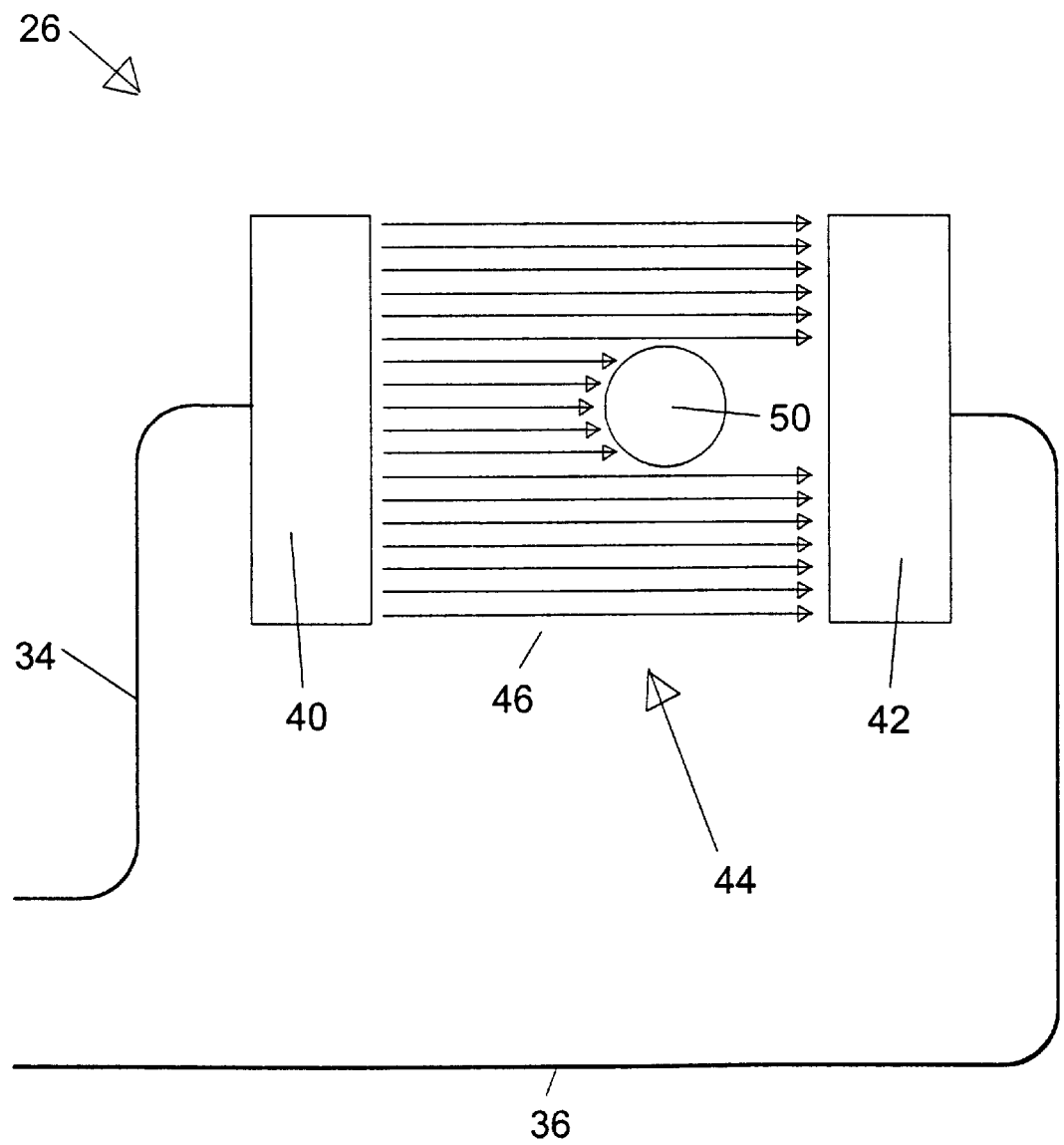
FIG. 4 is a more detailed block diagram of a portion of the embodiment shown in FIG. 3.

Referring also to FIG. 3 and FIG. 4, the preferred sensor 10 broadly comprises a sensing assembly 26; a sensor amplifier 28 capable of storing and executing software; a control board 30 for controlling the amplifier 28; a motion control board 32 for interfacing the control board 30 to the computing device 24; and interconnecting fiber optic and electrical cabling 34,36,38.

The sensing assembly 26 comprises a light emitting array 40 and a light receiving array 42, with a pill detection zone 44 defined therebetween. The light emitting array 40 is configured to emit a row of sixteen beams 46 of visible red light across the pill detection zone 44, and is connected to the amplifier 28 by means of a first fiber optic cable 34. Each beam 46 is approximately one hundredth of an inch wide. The beams 46 are spaced approximately six hundredths of an inch apart such that the pill detection zone 44 is approximately one inch wide.

The light receiving array 42 is configured to detect the sixteen beams 46 and is connected to the amplifier 28 by means of a second fiber optic cable 36. The light receiving array 42 is carried on a pill count sensor arm 48 of the vial gripping assembly 22 which is more fully disclosed in a copending application entitled "Vial Gripping Mechanism for Automatic Medicament Dispensing Machine" Ser. No. 10/040,824, filed Jan. 7, 2002, hereby incorporated into the present application by reference.

At the beginning of a pill counting process, the light receiving array 42 is moved into position by the arm 48 by action of the vial gripping mechanism 22, such that the light receiving array 42 can receive light emitted by the light emitting array 40. The pill detection zone 44 is defined as a substantially horizontal planar surface located between and defined by the light emitting and receiving arrays 40,42. During a prescription filling process, a pill 50 is made to pass through the pill detection zone 44 by operation of the automatic medicament dispensing machine 12.

It will be appreciated that visible red light is only one form of electromagnetic energy the present invention may be designed to use. Thus the invention may be configured to use infrared light, white light, or any other form of electromagnetic energy that would be blocked by the pill 50. Other forms of electromagnetic energy may require alternate embodiments of the sensing assembly 26 and the amplifier 28.

It will also be appreciated that dimensions given for the beams 46 are according to the preferred embodiment, at the light emitting array 40. However, the dimensions are a matter of design choice. The number, width, and spacing of the beams 46 can be modified to accommodate any size and shape pill 50. Due to the ability of the medicament dispensers 14 to consistently dispense the pill 50 in a predictable manner, the pill detection zone 44 typically does not need to be more than two inches wide. Therefore, no more than thirty-four beams 46 are typically needed.

The amplifier 28 is operable to automatically self-calibrate in order to compensate for changing detected light levels, and to generate a pill-sense signal at a pill-sense output 52 in response to the pill 50 in the pill detection zone 44. The amplifier 28 includes a memory and a processor enabling the amplifier 28 to store and execute software. A suitable amplifier 28 is available from Banner Engineering Corporation, Model No. R55FV.

The amplifier 28 receives a number of input signals, including a light level signal at a light level input 54 and a remote teach command signal at a remote teach input 56, and generates a number of output signals, including a light signal at a light output 58 and the pill sense signal at the pill sense output 52. The light level signal is an input signal to the amplifier 28 from the light receiving array 42 via the second fiber optic cable 36, communicating a light level detected by the light receiving array 42. The light level signal is used by the amplifier 28 during self-calibration, as described below, and to detect the pill 50 in the pill detection zone 44. The remote teach command signal is an input signal to the amplifier 28 from the control board 30 via the electrical cable 38, and is operable to initiate the self-calibration process. The light signal is an output signal from the amplifier 28 to the light emitting array 40 via the first fiber optic cable 34, and is operable to generate visible red light. The pill sense signal is an open collector NPN-type transistor output from the amplifier 28 to the control board 30 via the electrical cable 38, and operable to communicate detection of a pill 50 in the pill detection zone 44.

The amplifier 28 further includes a power input 60 for connection to a twenty-four volt direct current power supply. However, the amplifier 28 is operable to accept between twenty-two volts and twenty-six volts without adversely affecting operation.

The software comprises a combination of code segments stored within and executable by the amplifier 28. The software is operable to facilitate storing an initial light level value, comparing the current light level signal with the initial light level value, thereby detecting a pill 50. The code segments may be written in any programming language, as a matter of design choice. The Banner Model No. R55FV amplifier described above is supplied with a stock software. The stock software is adequate for counting pills, and causes the amplifier 28 to operate according to Banner's published manual. In the preferred embodiment, greater reliability and repeatability is achieved by minor modifications to the stock software as described herein and as set forth in detail in the attached source code appendix.

In the preferred embodiment, the control board 30 is located external to the computing device 24 and interfaces with the computing device 24 by means of the motion control board 32. The computing device 24 may be, for example, a conventional desktop or laptop personal computer and typically forms a component of the automatic medicament dispensing machine 12. The control board 30 is operable to receive the pill sense signal at a pill sense input 62 and generate the remote teach command signal at a remote tech output 64. Optionally, the control board 30 is operable to supply power for the amplifier 28 at a power output 66 through the electrical cable 38. The control board 30 may, as a matter of design choice, be located internal or external to the computing device 24.

In operation, a technician utilizes the computing device 24 of the automatic medicament dispensing machine 12 to initiate the prescription-filling process. Once a prescription is received, the computing device 24 instructs the vial gripping mechanism 22 to grasp a vial 68. Then the automatic medicament dispensing machine 12 moves the vial gripping mechanism 22 to an appropriate medicament dispenser 14. Once adjacent the appropriate medicament dispenser 14, the vial gripping mechanism 22 moves the arm 48 and therefore the receiving array 42 into position. The computing device 24 instructs the control board 30, via the motion control board 32, to issue the remote teach command signal. The control board 30 generates the remote teach command signal for input to the amplifier 28 via the electrical cable 38.

The amplifier 28, upon receiving the remote teach command signal, records, in the memory, the current light level signal received from the light receiving array 42 as the initial light level value. The amplifier 28 also ensures that the pill sense signal is in a tristate, signifying that there is no pill 50 in the pill detection zone 44. During the pill counting process the amplifier 28 performs, on a continuous basis, comparisons of the current light level signal and the initial light level value. Thus, the pill count sensor 10 is advantageously operable to self-calibrate in order to compensate for changing operating conditions, including power supply fluctuations and mechanical drift. The pill count sensor 10 can also be calibrated to operate at very high sensitivities to enable detection of very small pills not detectable by the prior art.

During the prescription-filling process, pills 50 pass through the pill detection zone 44 by operation of the automatic medicament dispensing machine 12. As each pill 50 passes through the detection zone 44, the pill 50 blocks a portion of the beams 46 emitted by the light emitting array 40, thereby reducing the amount of light received by the light receiving array 42. In response to the lower light level indicative of the presence of the pill 50 in the pill detection zone 44, the light receiving array 42 generates a substantially lower light level signal for input to the amplifier 28.

It will be appreciated that the color, texture, and other physical characteristics of the pill 50 do not affect its detection, since the present invention only relies on the pill's 50 ability to block light, not its ability to reflect. light. Furthermore, light reflected from background objects does not affect performance of the present invention, since occurrences external to the pill detection zone 44 are immaterial.

The sensor amplifier 28, upon receiving the substantially lower light level signal from the light receiving array 42, generates the pill sense signal for use by the control board 30. The pill sense signal results from the pill sense output 52 being forced to within one volt of ground. The pill sense signal is maintained, while the pill 50 is passing through the pill detection zone 44. The control board 30 sends the pill sense signal to the computing device 24 which accumulates multiple pill sense signals in such a manner as to generate a total pill count. The total pill count is used by the automatic medicament dispensing machine 12 in the prescription-filling process.

Alternatively, it will be appreciated that the control board 30 may include a mechanism for generating the total pill count. In this embodiment, the control board 30 need only inform the computing device 24 of the total pill count, either continuously, periodically, or when finished.

Once the pill 50 has passed completely through the pill detection zone 44, the light receiving array 42 again receives substantially the same light level as was recorded during initiation of the pill counting process, and the amplifier 28 again receives the light level signal corresponding to the empty pill detection zone 44. The pill sense signal is discontinued and the pill sense output 52 returns to the tristate, thereby readying the sensor 10 to detect the next pill 50 that enters the pill detection zone 44.

It will be appreciated that the present invention provides a unique pill count sensor 10 that does not require modification during initial installation; that provides automatic self-calibration through automatic detection of abnormal lighting conditions; and that does not generate false readings in the presence of electrical fields.

Having thus described a preferred embodiment of the invention, what is claimed as new and desired to be protected by Letters Patent includes the following:

1. A sensor using electromagnetic energy to count medicaments as they pass through a detection zone for use in an automatic medicament dispensing machine, the sensor comprising:

an emitter operable to emit the electromagnetic energy;

a detector positioned substantially opposite and spaced apart from the emitter and operable to detect the emitted electromagnetic energy, wherein the emitter and detector define the detection zone therebetween;

a sensor amplifier operable to sense changes of the detected electromagnetic energy and generate a sense signal corresponding to a sensed change in the detected electromagnetic energy caused by a medicament passing through the detection zone; and a control board operable to receive the sense signal and to cause a medicament count to be incremented.

2. The sensor as set forth in claim 1, wherein the emitter and the detector are operable to emit and detect, respectively, electromagnetic energy corresponding to visible red light.

3. The sensor as set forth in claim 1, wherein the sensor amplifier is operable to record an initial value corresponding to the amount of detected electromagnetic energy when the medicament is not in the detection zone.

4. The sensor as set forth in claim 1, wherein the control board is located within a computing device operable to communicate a value corresponding to a total number of detected medicaments.

5. The sensor as set forth in claim 1, wherein the control board is located external to a computing device operable to communicate a value corresponding to a total number of detected medicaments.

6. The sensor as set forth in claim 1, wherein the control board is operable to communicate a value corresponding to a total number of detected medicaments.

7. The sensor as set forth in claim 1, wherein the detection zone is between one half and two inches wide.

8. The sensor as set forth in claim 1, wherein the electromagnetic energy is emitted in between two and thirty-four separate beams.

9. The sensor as set forth in claim 8, wherein each beam is between one and three hundredths of an inch wide at the emitter.

10. The sensor as set forth in claim 8, wherein the beams are spaced between five and ten hundredths of an inch apart at the emitter.

11. A sensor using visible light to detect a medicament located in a detection zone for use in an automatic medicament dispensing machine, the sensor comprising:

an emitter operable to emit the visible light;

a detector positioned substantially opposite and spaced apart from the emitter and operable to detect the emitted visible light, wherein the emitter and detector define the detection zone therebetween;

a sensor amplifier operable to record an initial value of the detected visible light, sense changes therein, and generate a sense signal when less than the initial value of visible light is detected corresponding to a medicament passing through the detection zone; and a control board operable to receive the sense signal and to cause a medicament count to be incremented.

12. The sensor as set forth in claim 11, wherein the control board is located internal to a computing device operable to communicate a value corresponding to a total number of detected medicaments.

13. The sensor as set forth in claim 11, wherein the control board is located external to a computing device operable to communicate a value corresponding to a total number of detected medicaments.

14. The sensor as set forth in claim 11, wherein the control board is operable to communicate a value corresponding to a total number of detected medicaments.

15. The sensor as set forth in claim 11, wherein the detection zone is between three and five quarter inches wide.

16. The sensor as set forth in claim 11, wherein the electromagnetic energy is emitted in between ten and twenty separate beams.

17. A medicament dispensing machine for dispensing and counting countable medicaments, the medicament dispensing machine comprising:

a plurality of medicament dispensers operable to store and dispense medicaments;

a plurality of vial dispensers operable to dispense empty vials;

a vial gripping mechanism operable to move within the machine for retrieving and transporting vials;

a sensor carried on the vial gripping mechanism and using electromagnetic energy to count medicaments as they pass through a detection zone, the sensor including
an emitter operable to emit the electromagnetic energy,
a detector positioned substantially opposite and spaced apart from the emitter and operable to detect the emitted electromagnetic energy, wherein the emitter and detector define the detection zone therebetween,
a sensor amplifier operable to sense changes in the detected electromagnetic energy and generate a sense signal corresponding to a sensed change in the detected electromagnetic energy caused by a medicament passing through the detection zone, and
a control board operable to receive the sense signal and to cause a medicament count to be incremented; and a computing device operable to receive input related to dispensing and counting the countable medicaments, wherein the computing device is operationally coupled with the control board and further operable to control a prescription filling process.

18. The machine as set forth in claim 17, wherein the emitter and the detector are operable to emit and detect, respectively, electromagnetic energy corresponding to a plurality of beams of visible red light.

19. The machine as set forth in claim 17, wherein the detection zone is between three and five quarter inches wide.

20. A method of counting medicaments within a detection zone, the method comprising the steps of:

a) emitting and detecting electromagnetic energy across the detection zone;

b) recording an initial value of the detected electromagnetic energy;

c) comparing, on a continuous basis, the detected electromagnetic energy with the initial value;

d) detecting a change in the electromagnetic energy as a medicament passes through the detection zone and blocks a portion of the emitted electromagnetic energy;

e) generating a sense signal when a change in the electromagnetic energy is detected, corresponding to the medicament being located in the detection zone; and f) utilizing the sense signal to increment a count of the medicaments.

* * * * *